United States Patent [19]

Bacher et al.

[11] Patent Number: 4,631,831
[45] Date of Patent: Dec. 30, 1986

[54] TREAD DEPTH PROBE AND COMPUTER

[75] Inventors: William J. Bacher, Cedar Rapids; Jeffrey J. Corpstein, Marion, both of Iowa

[73] Assignee: Bandag Licensing Corporation, Muscatine, Iowa

[21] Appl. No.: 824,814

[22] Filed: Jan. 31, 1986

[51] Int. Cl.⁴ .............................................. G01B 3/28
[52] U.S. Cl. .............................. 33/169 B; 33/172 E; 33/558
[58] Field of Search ............. 33/169 B, 169 R, 172 E, 33/172 R, 558, 561

[56] References Cited

U.S. PATENT DOCUMENTS

| | | | |
|---|---|---|---|
| 2,190,899 | 2/1940 | Vierling | 33/169 B |
| 2,324,998 | 7/1943 | Dague | 33/169 B X |
| 2,654,156 | 10/1953 | Boyer | 33/169 B |
| 3,936,945 | 2/1976 | Jevremov | 33/169 B X |
| 4,195,413 | 1/1980 | Haraguchi et al. | 33/169 B |
| 4,227,308 | 10/1980 | Talansky et al. | 33/169 B |

FOREIGN PATENT DOCUMENTS

| | | | |
|---|---|---|---|
| 184668 | 2/1956 | Austria | 33/169 B |
| 897611 | 1/1982 | U.S.S.R. | 33/169 B |

Primary Examiner—William D. Martin, Jr.
Attorney, Agent, or Firm—Frank B. Hill

[57] ABSTRACT

A tread depth probe for measuring the depth of a tread groove in a tire comprising a retaining and release mechanism to retain the probe pin in a retracted position when not in use and a release mechanism to release the probe pin when in use and having a measuring system permitting multiple tire groove depth readings while permitting the tread depth probe to be in the released position.

5 Claims, 13 Drawing Figures

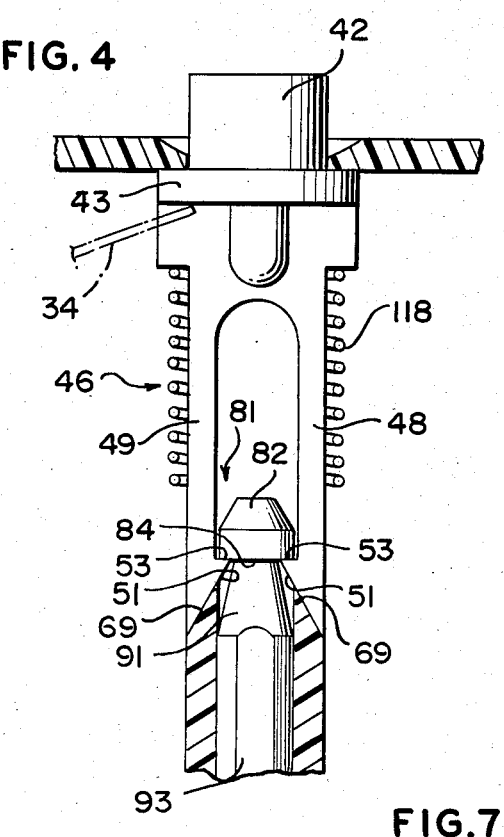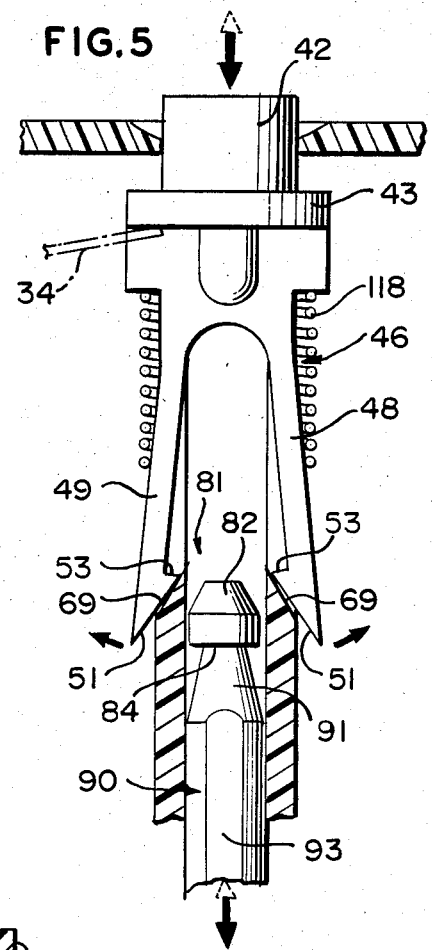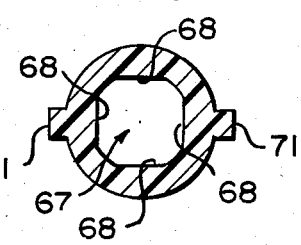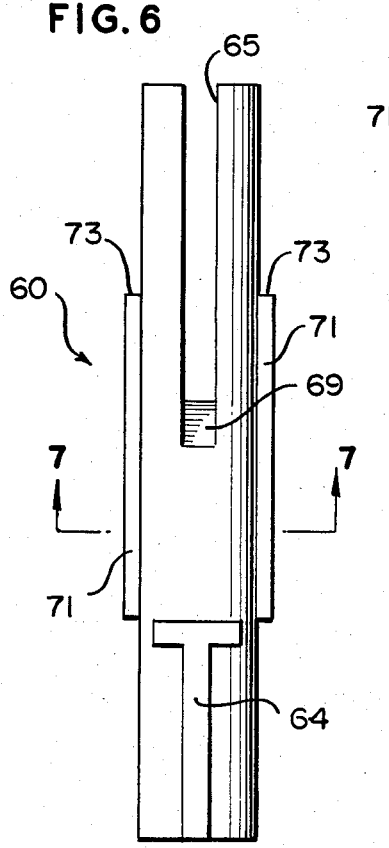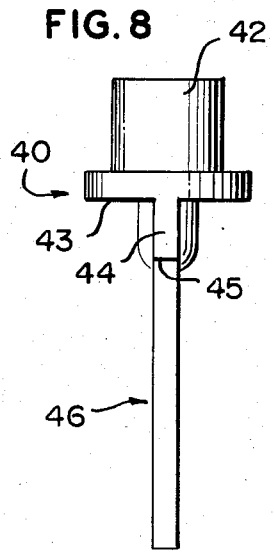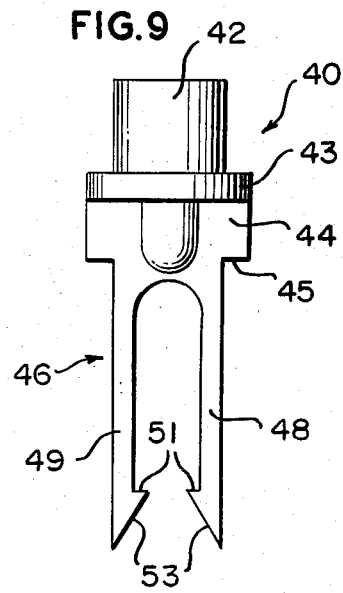

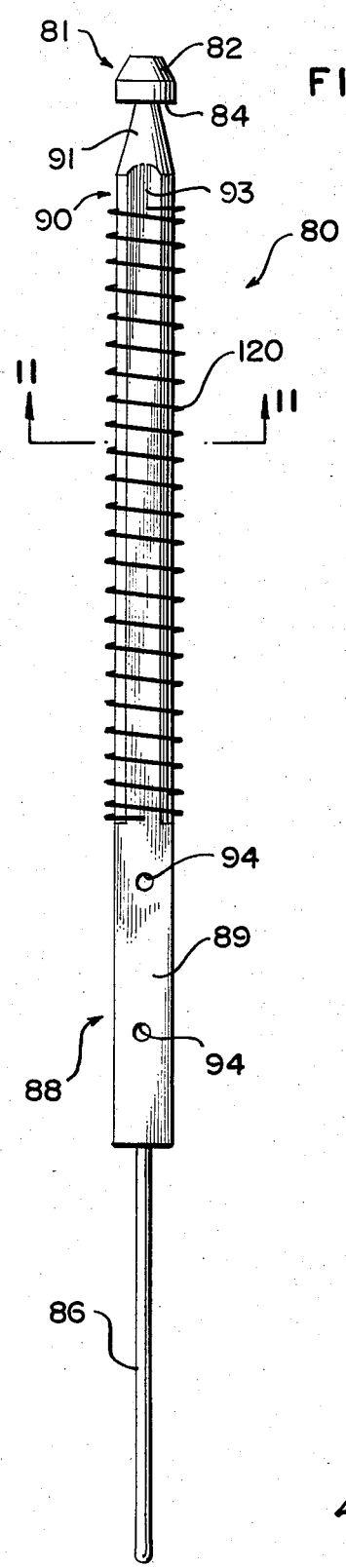
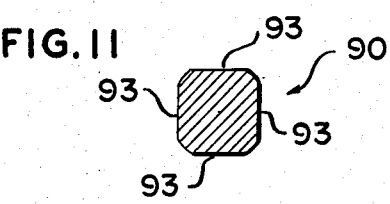
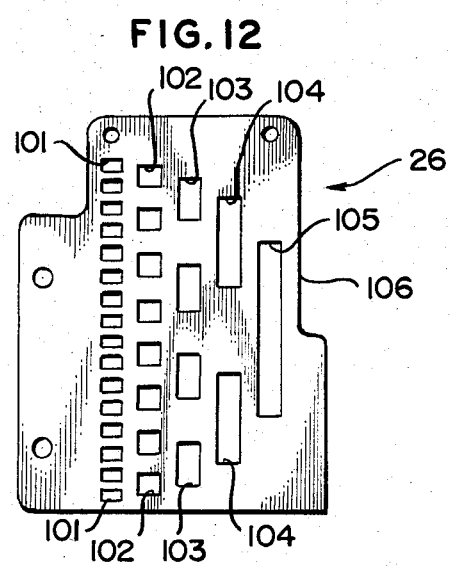
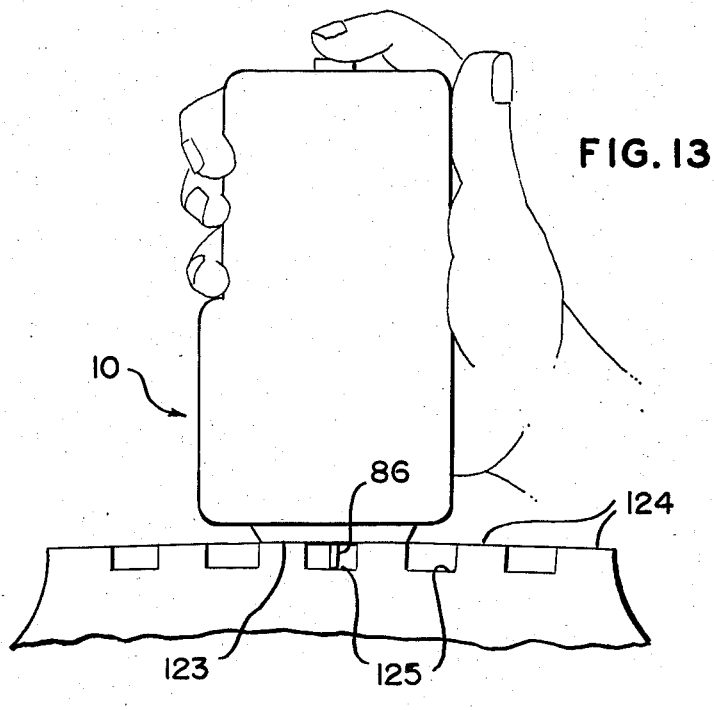

TREAD DEPTH PROBE AND COMPUTER

This invention relates to a hand-held device for measuring the depth of a tread groove formed in a tire tread design, having a tread depth probe pin which can be positioned in the extended mode while in operation condition to provide multiple groove readings of the tread depths, permitting averaging of the multiple tire tread depth readings.

In general, when persons are responsible for the tire program in large tire fleets or small tire fleets, they must review not only the initial cost of tires but the cost they experience per mile or thousand miles of operation. In order to calculate these various costs, the tread depth of the tire after use must be determined and compared with the original depth in reference to the mileage the tire has operated. This is important in determining the wear-out mileage projection for tires, the cost per mile computations, and these figures are important when comparing various tires to tires they are competing with.

Various tests are used to calculate the tread depth of tires after they have been in operation. Many of these methods require manual measuring of the tread depths at various positions around the tire, recording this material manually, and conducting calculations from these figures.

During some tests, there may be tires tested having tread depths taken at two positions for each groove in the tread. Other tests may require taking tread depths at four positions on the tire in each groove.

There have been some attempts to provide measuring devices that have electronic probing, such as U.S. Pat. No. 4,195,413. These devices are cumbersome and are not hand-held devices and lack the convenience necessary to provide operators of a vehicle any access to check their own tires so they have first-hand knowledge of the readings and the comparisons.

It is, therefore, an object of the present invention to provide a hand-held device that can be used with an electronic probe which is mechanically extended and held in a retained postion with the mechanism so constructed that the probe can be released to its extended position and positioned in a tread groove with a measurement made and then removed and positioned again in the tread groove and another reading taken until the necessary number of readings are made, then the device will be programmed to average the multiple tread groove readings. After the calculations have been made, the depth probe can be returned to its retracted position to prevent damage.

The invention will now be described in greater detail with reference to the company drawings herein;

FIG. 4 is an enlarged partial sectional view of the upper portion of the retaining and releasing mechanism taken generally along line 4—4 of FIG. 2 showing the assembly in the retained position;

FIG. 5 is similar to FIG. 4 showing the retaining and releasing mechanism in the released position with the probe release button in the down position;

FIG. 6 is a front view of the central member of the tread depth probe mechanism as shown in FIG. 2;

FIG. 7 is a cross-sectional view taken along line 7—7 in FIG. 6 showing the cross-section of the central member;

FIG. 8 is a front view of the probe release button member, as shown in FIG. 2;

FIG. 9 is a side view of the probe release button member, as shown in FIG. 8;

FIG. 10 is a front view of the probe member of the tread depth probe assembly;

FIG. 11 is a cross-sectional view of the probe member taken along 11—11 of FIG. 10;

FIG. 12 is a front view of the encoder plate which is part of the tread depth probe assembly, as shown in FIG. 2; and FIG. 13 is a cross-sectional view of a tire tread illustrating the hand-held computer in position to take a tread depth reading.

Figure 1:
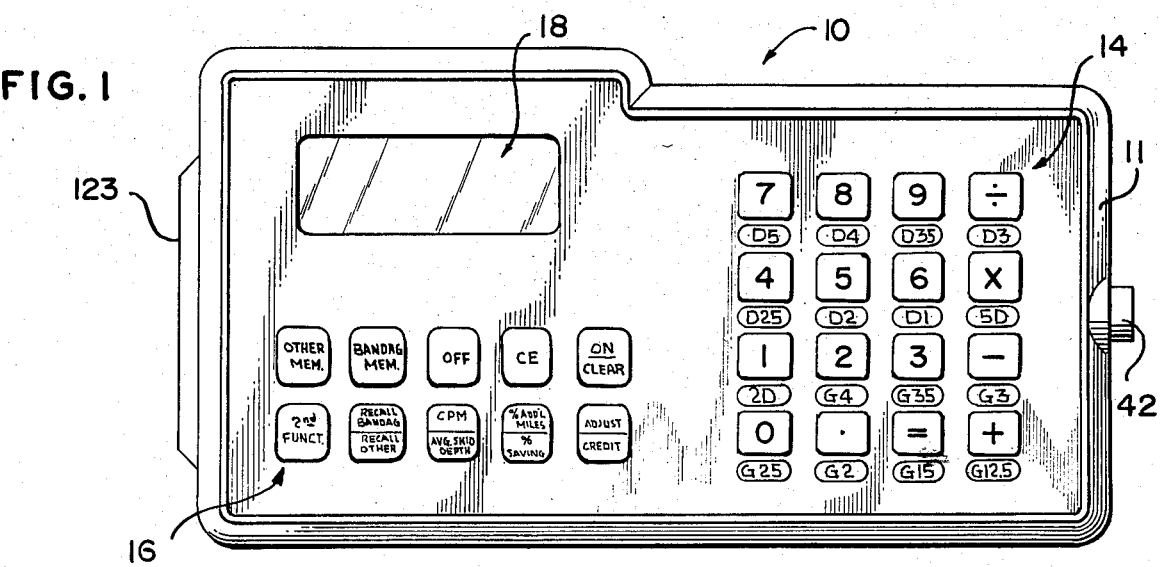
FIG. 1 is a top plan view of the hand-held calculator.
Figure 2:
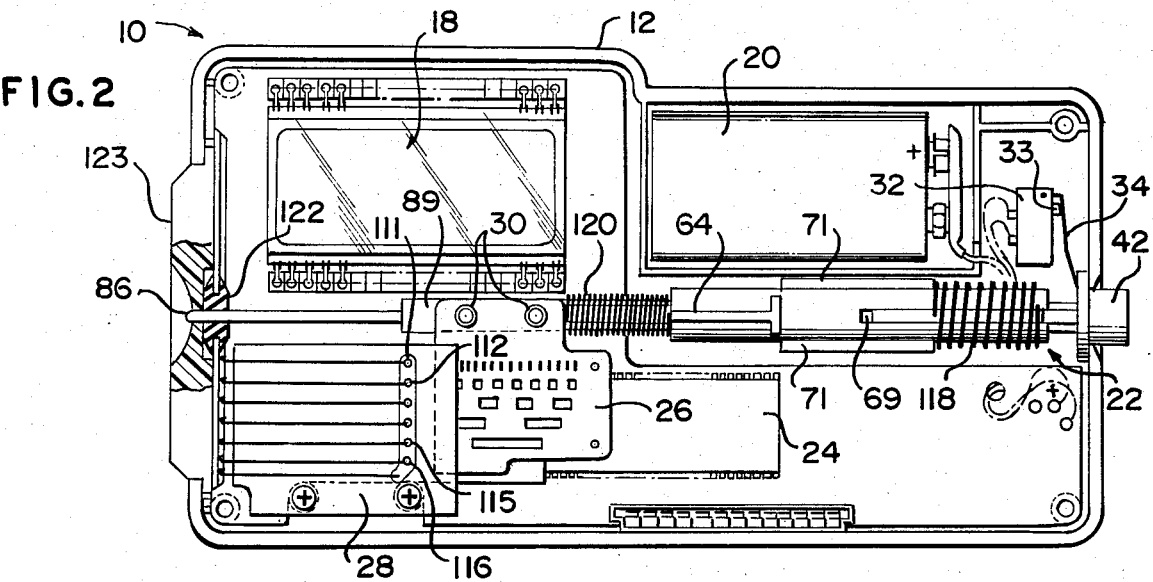
FIG. 2 is a top plan view similar to FIG. 1 with the cover member removed showing the retaining and releasing mechanism for the tread depth probe in the retracted position.

In FIGS. 1 and 2 is shown a hand-held computer generally referred to by numeral 10. The hand-held calculator is made up of two major pieces, one is a top member 11 and the second is a lower member 12. The top member 11 has three major elements. They are a standard arithmetic keyboard identified by numeral 14 and a calculator or computer keyboard identified by numeral 16 and a display screen 18. Also shown is the probe release button 42.

Referring to FIG. 2, the hand-held computer 10 has the top member 11 removed so that we can see the inside of the hand-held computer 10. The hand-held computer 10 has various elements. Some of the major ones are identified. This is a printed circuit with transistors and in order to understand the present invention, these elements are not needed to be discussed in detail.

There is a display screen 18 shown and a power source which is a standard 9-volt battery in the preferred embodiment identified by numeral 20. The tread depth probe assembly 22 is shown in its retracted position. A computer chip 24 is shown. An encoder plate 26 is shown and the receiver plate 28 is shown and will be discussed in more detail below.

The encoder plate 26 is secured to the tread depth probe assembly 22 by connectors 30. The encoder plate 26 works in conjunction with the receiver plate 28. An actuator switch 32 is mounted in a lower unit 12 adjacent the tread depth probe assembly 22. The actuator switch has an actuator button 33 and an actuator arm 34.

Referring to FIGS. 8 and 9, the probe release button member 40 is shown. This member 40 has a button end 42, a circular actuator flange 43 and a spring retainer flange 44 with a spring surface 45. The probe release button member 40 is provided with bifurcated retainer legs 46, having legs 48 and 49. The legs 48 and 49 are provided with cam surfaces 53 and retainer surfaces 51. The probe release button member 40 is made out of plastic material and the bifurcated retainer legs 46 are flexible and can be moved in relation to each other, as will be explained in more detail below.

FIG. 6 shows a central member 60 of the tread depth probe assembly 22. This member is in the form of a cylinder 62 and has a locating T 64 positioned at its lower end and leg slots 65 positioned at its upper end. The cylinder 62 shown in FIG. 7 has probe surfaces 67 which consist of four guide surfaces 68. Cam surfaces 69 run from the outside of cylinder 62 to its inside, making contact with the guide surface 68 of the probe surfaces 67. The cylinder 62 has spring flanges 71 on its opposite sides, as can be seen in FIGS. 6 and 7. The spring flanges 71 have spring surfaces 73 at their upper ends.

FIG. 10 shows a probe member 80 with a cam member 81 at its upper end with a cam surface 82 as its side surface and a retaining surface 84 at its bottom end. At the lower end of the probe member 80, is probe pin 86, which is connected to an encoder block 88 which has an encoder surface 89. A body member 90 is connected to the cam member 81 by a probe cone surface 91. At the other end, body member 90 is connected to the encoder block 88. The body member 90 has guide surfaces 93 which work in conjunction with guide surfaces 68 of the central member 60. The encoder surface 89 has openings 94 which receive connectors 30 to secure the encoder plate 26 to the encoder surface 89.

Figure 3:
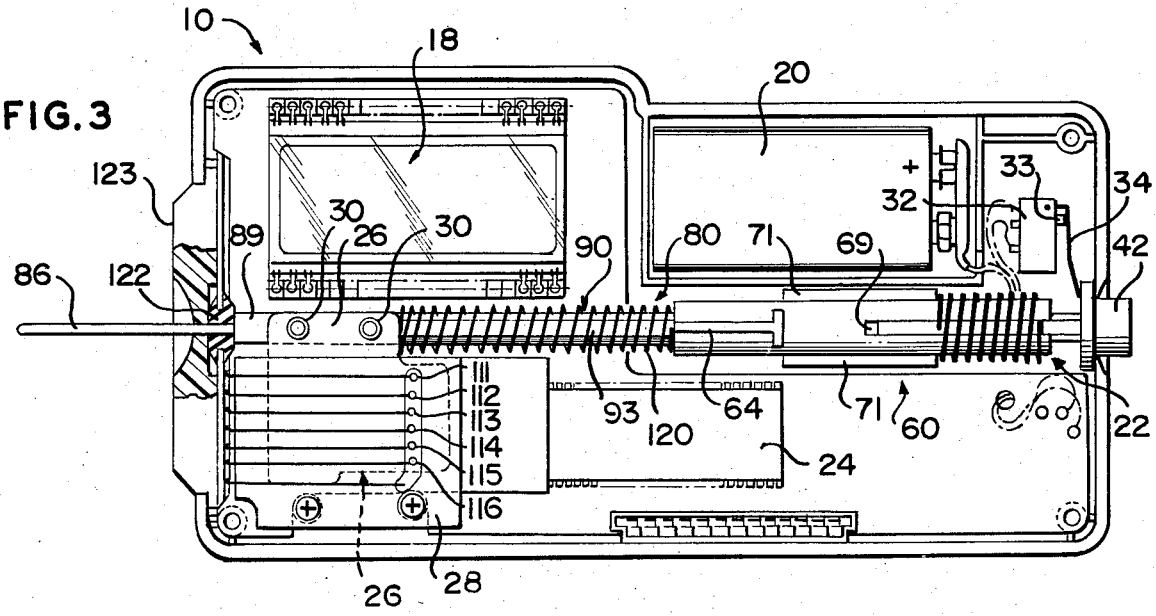
FIG. 3 is a top plan view similar to FIG. 2 with the retaining and releasing mechanism for the tread depth probe in the released position.

Encoder plate 26, as viewed in FIG. 12, of the depth probe assembly 22 has a series of code holes or openings. One series of code holes is identified as 101, one series is identified as 102, one series is identified as 103, another is identified as 104, and another series is identified as 105, and the outside edge of the encoder plate 26 is identified as 106. These code hole series line up with infrared light beams not shown which are positioned under the receiver plate 28 in alignment with infrared receivers shown in FIGS. 2 and 3, by numerals 111, 112, 113, 114, 115, and 116.

The infrared light beams are under calculator or computer control when the system is operating. These will take the readings of the depth and transfer them through a gray code to the computer chip 24 for storage in use during the calculations.

Referring to FIG. 2, the depth probe assembly 22 is in its retracted position. As viewed in FIG. 4, the probe release button member 40 has engaged the cam member 81 of the probe member 80. A spring 118 acts on the spring surface 45 of probe release button member 40 and the spring surface 73 of central member 60 to move the probe release button member 40 to its upper position. The locating T 64 acts with a receiving slot in the lower member 12, not shown, to hold the central member 60 in a stable position and in conjunction with the retaining slots in the top member 11, not shown, so that the tread probe assembly 22 will be stationary when the spring 18 is forcing the probe release button member 40 to its upper position. At this position, the retainer surfaces 53 of probe release button member 40 engage the retaining surface 84, holding the probe member 80 in its up or retracted position.

Spring 120 is positioned around the body member 90 and acts on the pressure surface 121, connecting the encoder block 88 with the body member 90 and at the lower end of the cylinder 62 at the other end. Spring 120 urges the probe member 80 to a down or extended position away from the central member 60. The probe member 80 cannot move to the extended position while the retainer surfaces 53 are acting on the retaining surface 84 holding the probe member 80 in its up position.

When the hand-held computer 10 is to be operated, there are various keyboard functions to perform. First, the calculator keyboard 16 is activated to turn the unit on. At this time, if mere standard arithmetic functions are to be performed by the computer 10, the keyboard 14 will be used and the probe member 80 would be held in its retained position. When depth readings are to be made, after the unit has been turned on, the probe release button 42 will be pushed to its down position which releases the probe release button member 40 from the probe member 80.

Referring to FIG. 5, when the probe release button 42 is pushed to its down position, the cam surfaces 51 will act on the cam surfaces 69 of the central member 60, moving the retainer surfaces 53 away from contact with the retaining surfaces 84 of the probe member 80. At this time, the spring 120 will move the probe member 80 to its released or extended position, as viewed in FIG. 3. A protector glass shield 128 is mounted over the infrared light beams and permits the beam to pass through to the infrared receivers 111 through 116. The probe member 80 is stopped at the extended position when the lower end of the encoder block 88 makes contact with a rubber absorber ring 122. The probe pin 86 is now in its extended position.

As viewed in FIG. 13, the hand-held computer 10 has moved into position over a tread 124 where the positioning surface 123 of the computer 10 is positioned on the upper portion of the tread surface 124 so that the probe pin 86 is positioned in a tread groove 125. When this occurs, the probe pin 86 is pushed back into the hand-held calculator 10 and acts against the spring 120 until the position surface 123 meets the top of the tread 124. At this time, the operator will push the button end 42 which will cause the circular actuator flange 43 to contact the actuator arm 34, moving it down to depress activator button 33 of the activator switch 32. This, in turn, will pass electricity to the infrared light beams (not shown) positioned in alignment with infrared receivers 111 through 116. The light passing through the code holes of encoder plate 26 will be read by the infrared receivers 111 through 116. As soon as the button end 42 is released and returned to the up position by spring 118, the reading is then transferred to the computer chip 24. As many readings as are necessary can be taken moving around the tire. These will go into the computer chip 24 (in the preferred embodiment a maximum of 99 readings are possible) and after the required number is taken, the computer keyboard 16 can be operated to give an average of these multiple readings.

After the readings are completed and other calculations are to be made with the computer, the probe member 80 can be returned from its extended position to the retracted position. At this time, the operator moves the probe pin 86 into its up position. This causes the cam surface 82 to contact the cam surfaces 51 of the probe release button member 40, moving the legs 48 and 49 away from the center of cylinder body 62 and permitting the cam member 81 to move past retainer surfaces 53. After the cam retaining surface 84 has passed the retainer surfaces 53, the bifurcated legs 46 will move towards the center of cylinder body 62 and as the probe member 80 is acted upon by the spring 120 to move to the down position, contact will again be made between the retainer surfaces 53 and the retaining surface 84, holding the probe member 80 in its up or retracted position ready for future readings.

As various changes could be made in the above constructions and methods without departing from the scope of the invention, it is intended that all matter contained in the above description or shown in the accompanying drawings should be interpreted as illustrative and not in a limiting sense.

What is claimed is:

1. A hand held computer used to measure the tread groove depths having an electronic tread depth probe assembly having a retracted and an extended position and comprising,
   (a) top and lower members forming the body of said computer,
   (b) said tread depth probe assembly positioned within said computer body,
   (c) said probe assembly having a stationary central member,
   (d) a probe member is movably positioned in said central member and extending out its lower end,
   (e) a probe release button member is movably positioned at the upper end of said central member,
   (f) a pressure means acts between said button member and said central member to hold said button member in a retracted position,
   (g) a pressure means acts between said probe member and said central member to hold said probe member in an extended position,
   (h) said probe release button member has a securing means to hold said probe member in a retracted position, and,
   (i) said button member can be moved to a release position to release said securing means from said probe member permitting said probe member to move to its extended position.

2. A hand held computer as claimed in claim 1, including,
   (a) said probe member has a cam member with a cam retaining surface,
   (b) said probe release button member has bifurcated retainer legs, with leg retainer surfaces, and,
   (c) said leg retainer surfaces act on said cam retainer surface to secure said probe member in a retracted position.

3. A hand held computer as claimed in claim 2, including,
   (a) an encoder plate secured to said probe member,
   (b) a receiver means secured in said computer body,
   (c) a light beam means secured in said computer body is aligned with said receiver means, and
   (d) said encoder plate is positioned between said light means and said receiver means.

4. A hand held computer as claimed in claim 3, including,
   (a) an actuator means secured in said computer body,
   (b) a power source secured in said computer body and connected to said light beam means and said receiver means,
   (c) a computer chip secured in said computer body and connected with said receiver means, and
   (d) a display screen secured to and shown outside said computer body and connected with said computer chips.

5. A hand held computer as claimed in claim 4, including,
   (a) an actuator flange as part of said button member,
   (b) an actuator arm as part of said actuator means and aligned with said actuator flange,
   (c) said actuator flange can move said actuator arm to an activation position,
   (d) when said actuator arm is in the activation position said light beam means is activated,
   (e) said encoder plate permits said receiver means to receive light from said light beam means to record the distance said probe member extends out of said computer body with said computer chip.

* * * * *